US012607192B2

(12) United States Patent
Katsu et al.

(10) Patent No.: US 12,607,192 B2
(45) Date of Patent: Apr. 21, 2026

(54) ELECTRIC TURBOCHARGER WITH DIFFUSER PLATE

(71) Applicant: IHI Corporation, Tokyo (JP)

(72) Inventors: Yoshihito Katsu, Tokyo (JP); Shun Nakayama, Tokyo (JP); Yuji Sasaki, Tokyo (JP)

( * ) Notice: Subject to any disclaimer, the term of this patent is extended or adjusted under 35 U.S.C. 154(b) by 0 days.

(21) Appl. No.: 19/026,372

(22) Filed: Jan. 17, 2025

(65) Prior Publication Data

US 2025/0154958 A1      May 15, 2025

Related U.S. Application Data

(63) Continuation of application No. PCT/JP2023/016121, filed on Apr. 24, 2023.

(30) Foreign Application Priority Data

Sep. 16, 2022      (JP) ................................. 2022-147793

(51) Int. Cl.
F04D 25/06          (2006.01)
F04D 17/10          (2006.01)
(Continued)

(52) U.S. Cl.
CPC ............. F04D 25/06 (2013.01); F04D 17/10 (2013.01); F04D 29/441 (2013.01);
(Continued)

(58) Field of Classification Search
CPC ................. F04D 25/045; F04D 25/024; F04D 25/06–082; F04D 17/10; F04D 13/06;
(Continued)

(56) References Cited

U.S. PATENT DOCUMENTS

| | | | | |
|---|---|---|---|---|
| 2,993,449 | A | * | 7/1961 | Harland .............. F04D 13/0646 |
| | | | | 417/357 |
| 6,845,617 | B1 | * | 1/2005 | Allen ...................... F02B 37/10 |
| | | | | 123/565 |

(Continued)

FOREIGN PATENT DOCUMENTS

| | | |
|---|---|---|
| JP | 2004-222411 | 8/2004 |
| JP | 2006-325315 | 11/2006 |

(Continued)

OTHER PUBLICATIONS

International Preliminary Report on Patentability with Written Opinion dated Mar. 27, 2025 for PCT/JP2023/016121.

(Continued)

*Primary Examiner* — Thomas Fink
(74) *Attorney, Agent, or Firm* — SHIPWAY IP

(57)          ABSTRACT

An example electric turbocharger may include: a rotating shaft; a motor including a rotor fixed to the rotating shaft, and a stator; a motor casing housing the motor; a compressor casing including a scroll flow passage; a diffuser plate located between the motor casing and the compressor casing, a heat dissipation member located between the diffuser plate and the stator; and a seal located between the diffuser plate and the stator and located between the heat dissipation member and the rotating shaft.

20 Claims, 7 Drawing Sheets

(51) Int. Cl.

| | | |
|---|---|---|
| *F04D 29/44* | (2006.01) | |
| *F04D 29/58* | (2006.01) | |
| *H02K 9/19* | (2006.01) | |
| *H02K 9/22* | (2006.01) | |

(52) U.S. Cl.
CPC ............. *F04D 29/582* (2013.01); *H02K 9/19*
(2013.01); *H02K 9/223* (2021.01)

(58) Field of Classification Search
CPC ... F04D 13/0653; F04S 13/06; F04S 13/0653;
H02K 2209/00; H02K 9/19–20; H02K
9/22–227; H02K 5/10
See application file for complete search history.

(56) References Cited

U.S. PATENT DOCUMENTS

| | | | | |
|---|---|---|---|---|
| 8,157,544 | B2* | 4/2012 | Shimizu | H02K 5/203 |
| | | | | 417/407 |
| 2002/0040581 | A1* | 4/2002 | Finger | F04D 25/066 |
| | | | | 417/407 |
| 2007/0036664 | A1* | 2/2007 | Shibui | H02K 7/14 |
| | | | | 417/407 |
| 2014/0090626 | A1* | 4/2014 | An | F16C 19/547 |
| | | | | 29/598 |
| 2015/0337850 | A1* | 11/2015 | An | F04D 29/284 |
| | | | | 417/423.13 |
| 2019/0226486 | A1* | 7/2019 | Iizuka | F02B 39/00 |
| 2019/0284992 | A1* | 9/2019 | Hoke | F02B 39/10 |
| 2019/0345956 | A1* | 11/2019 | Iizuka | F04D 25/0606 |
| 2020/0080470 | A1* | 3/2020 | Hehn | F02B 37/10 |
| 2020/0259193 | A1 | 8/2020 | Sakota et al. | |
| 2021/0013752 | A1* | 1/2021 | Futae | H02K 1/185 |
| 2021/0293253 | A1* | 9/2021 | Chavez Castellanos | |
| | | | | F04D 29/5826 |
| 2021/0372435 | A1* | 12/2021 | Matsuzaki | H01M 8/04111 |
| 2022/0145906 | A1* | 5/2022 | Scholz | F04D 29/5806 |
| 2022/0220981 | A1* | 7/2022 | Nejedly | F04D 29/706 |
| 2023/0187997 | A1 | 6/2023 | Nakayama et al. | |
| 2023/0279873 | A1* | 9/2023 | Sakota | F04D 29/284 |
| | | | | 417/423.14 |
| 2025/0003364 | A1* | 1/2025 | Deutscher | F02B 37/10 |

FOREIGN PATENT DOCUMENTS

| | | |
|---|---|---|
| JP | 2010-045905 | 2/2010 |
| JP | 2012-191772 | 10/2012 |
| JP | 2015-082897 | 4/2015 |
| JP | 2019-009937 | 1/2019 |
| WO | 2019/087970 | 5/2019 |
| WO | 2019/220523 | 11/2019 |
| WO | 2022/034773 | 2/2022 |
| WO | 2022/044764 | 3/2022 |

OTHER PUBLICATIONS

International Search Report dated Mar. 27, 2025 for PCT/JP2023/016121.
International Search Report dated Jul. 18, 2023 for PCT/JP2023/016121.

* cited by examiner

ELECTRIC TURBOCHARGER WITH DIFFUSER PLATE

CROSS-REFERENCE TO RELATED APPLICATIONS

This application is a continuation application of PCT Application No. PCT/JP2023/016121, filed on Apr. 24, 2023, which claims the benefit of priority from Japanese Patent Application No. 2022-147793, filed on Sep. 16, 2022. The entire contents of the above listed PCT and priority applications are incorporated herein by reference.

BACKGROUND

Field

The present disclosure relates to an electric turbocharger.

Description of the Related Art

Japanese Unexamined Patent Application Publication No. 2010-045905 discloses a motor-integrated compressor turbine unit. The compressor turbine unit includes a motor casing that houses a motor, and a compressor casing. A diffuser plate forming a diffuser flow passage is disposed between a housing and the compressor casing.

SUMMARY

Disclosed herein is an example electric turbocharger. The electric turbocharger includes: a motor casing configured to house a motor; a compressor casing including a scroll flow passage; and a diffuser plate disposed between the motor casing and the compressor casing. The electric turbocharger may include: a rotor fixed to a rotating shaft; a motor stator fixed to the motor casing; a heat dissipation member disposed between the diffuser plate and the stator; and a seal member disposed between the diffuser plate and the stator and disposed between the heat dissipation member and the rotating shaft.

In this electric turbocharger, the heat dissipation member is disposed between the diffuser plate and the stator. Since heat from the stator is transferred to the diffuser plate via the heat dissipation member, the heat removal performance can be improved as compared with a configuration in which the heat dissipation member is not interposed therebetween. Further, the seal member is disposed between the diffuser plate and the stator, and the seal member is disposed between the heat dissipation member and the rotating shaft. Therefore, the seal member may prevent gas around the rotating shaft from passing between the diffuser plate and the stator, reaching the heat dissipation member, and affecting the heat dissipation member.

In some examples, the stator may be formed with a seal groove housing the seal member and contacting the seal member. By housing the seal member in the seal groove, the seal member can be held in the seal groove.

In some examples, the stator may include: a heat dissipation member installation portion where a heat dissipation member is installed; and a seal member installation portion facing the diffuser plate, protruding from the heat dissipation member installation portion, and being formed with the seal groove. The diffuser plate may be formed with a recess receiving the seal member installation portion and contacting the seal member. It is necessary to ensure electrical insulation between the diffuser plate and a coil of the stator.

Since the seal groove is formed in the seal member installation portion protruding from the heat dissipation member installation portion, the seal groove can be formed at a position farther from the coil than the heat dissipation member installation portion, and electrical insulation between the diffuser plate and the coil of the stator can be readily secured.

In some examples, the heat dissipation member may be a heat dissipation pad having a predetermined shape. Use of the heat dissipation pad facilitates installation at a predetermined position.

In some examples, the stator may include a heat dissipation member installation portion where the heat dissipation pad is installed, and a positioning portion protruding from the heat dissipation member installation portion and positioning the heat dissipation pad. By disposing the heat dissipation pad so as to interfere with the positioning portion and be along the positioning portion, the heat dissipation pad is positioned on the heat dissipation member installation portion.

In some examples, a cooling water flow passage through which cooling water flows may be formed in the diffuser plate, and the heat dissipation member may be disposed between the cooling water flow passage and the stator. By disposing the heat dissipation member between the cooling water flow passage and the stator, the heat from the stator is readily transferred to the cooling water flow passage.

In some examples, the stator may include a resin portion, and thermal conductivity of the heat dissipation member may be higher than thermal conductivity of the resin portion and lower than thermal conductivity of the diffuser plate. The heat is transferred from the resin portion of the stator to the heat dissipation member, and from the heat dissipation member to the diffuser plate.

In some examples, the heat dissipation member may be a heat dissipation pad, the diffuser plate may include a first end surface in contact with the heat dissipation pad and a second end surface forming a diffuser flow passage on a side opposite to the first end surface, and a thickness of the heat dissipation pad may be thinner than a thickness from the first end surface to the second end surface of the diffuser plate. By making the thickness of the heat dissipation pad thinner than the thickness of the diffuser plate, the heat removal performance from the stator to the diffuser plate can be improved.

Additionally, an example electric turbocharger is disclosed herein. The electric turbocharger includes: a motor including a rotor and a stator; a rotating shaft configured to rotate by driving of the motor; an impeller fixed to the rotating shaft; a compressor casing configured to house the impeller; a diffuser plate fixed to the compressor casing; a heat dissipation layer disposed between the diffuser plate and the stator; and a seal portion disposed between the diffuser plate and the stator and disposed between the heat dissipation layer and the rotating shaft to restrict passage of gas.

DETAILED DESCRIPTION

Figure 1:
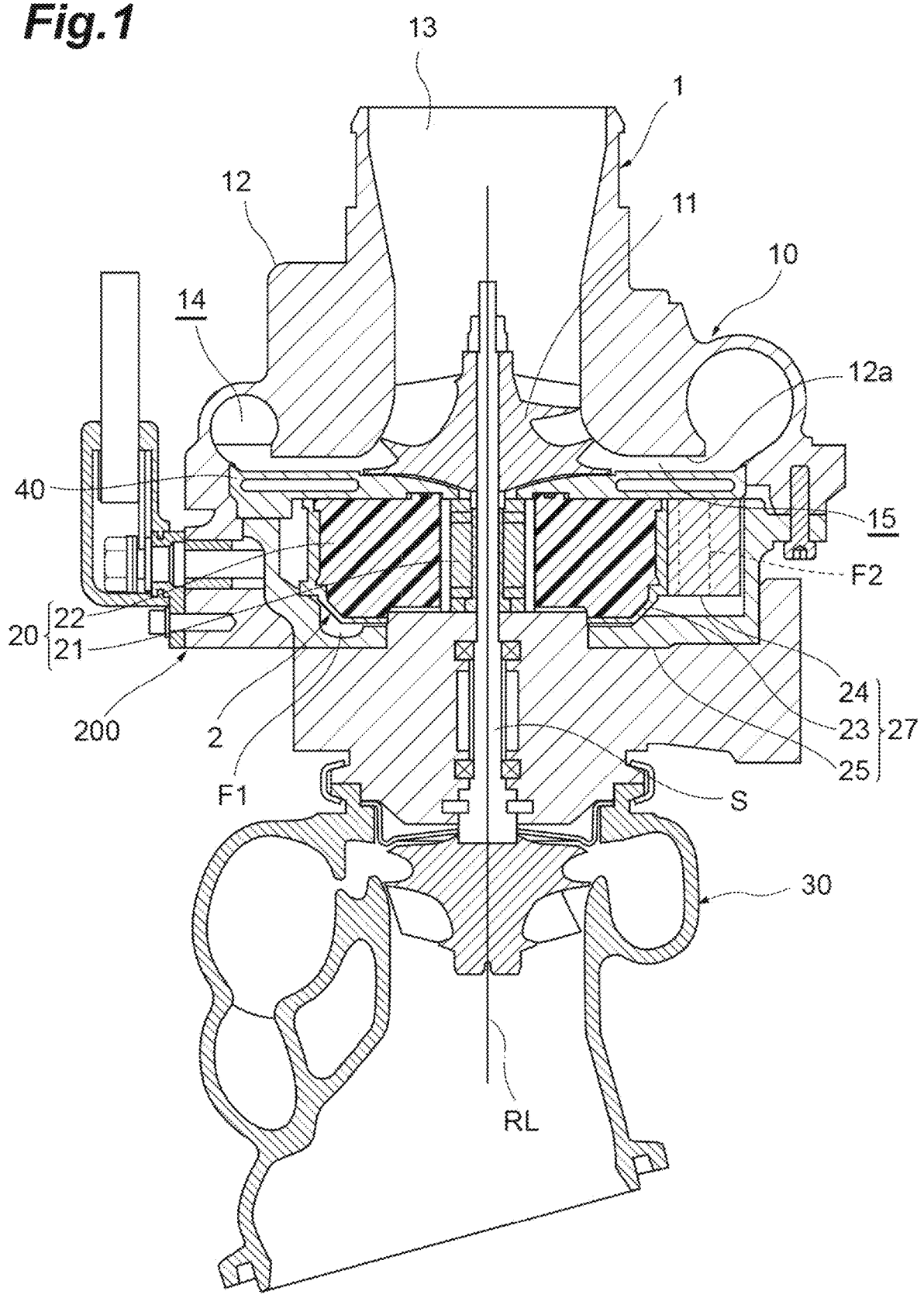
FIG. 1 is a cross-sectional view schematically illustrating an example of an electric turbocharger.
Figure 2:
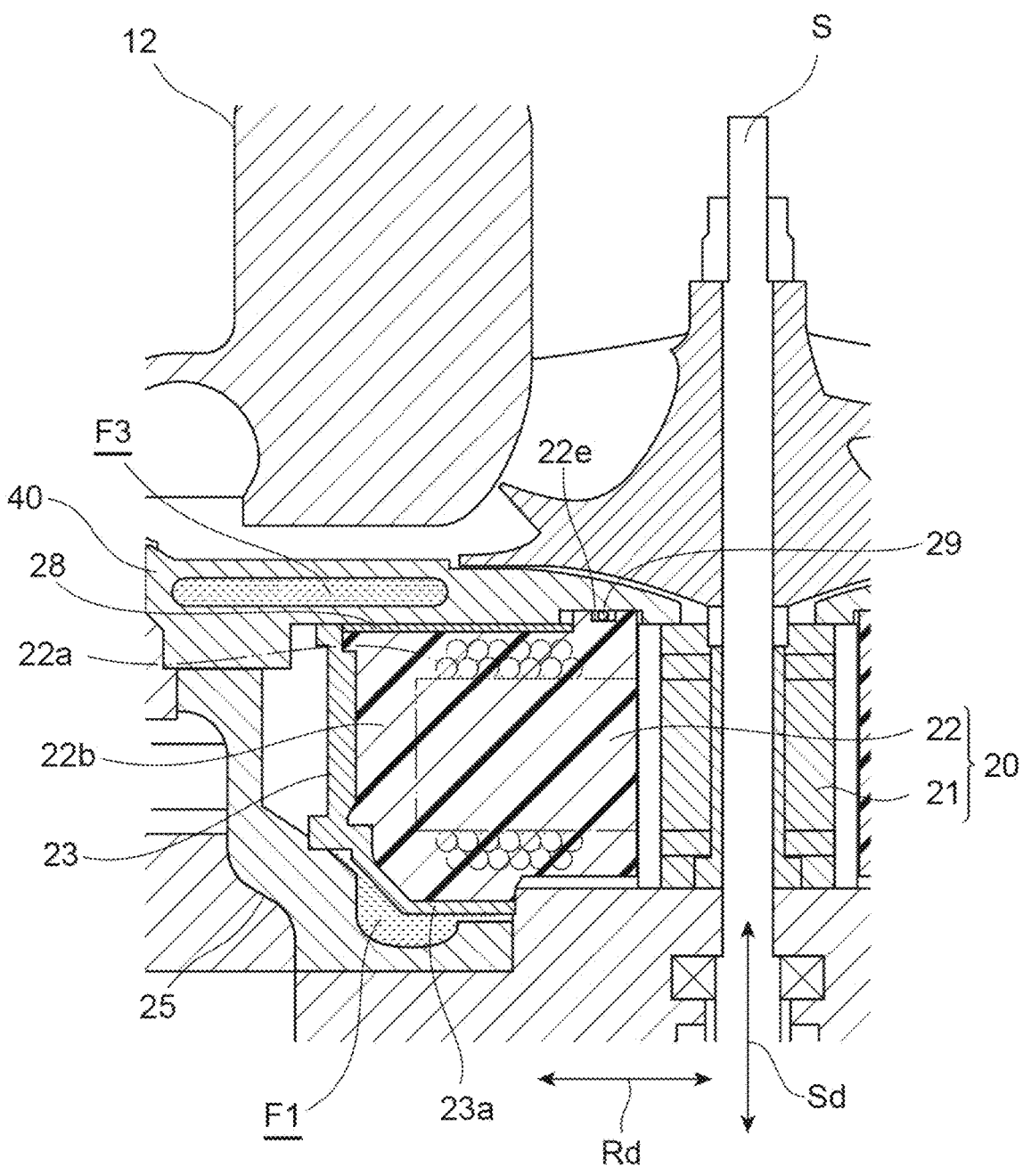
FIG. 2 is a partially enlarged cross-sectional view of the electric turbocharger illustrated in FIG. 1.

In the following description, with reference to the drawings, the same reference numbers are assigned to the same components or to similar components having the same function, and overlapping description is omitted. FIG. 1 is a cross-sectional view of an example electric turbocharger 1. FIG. 2 is an enlarged cross-sectional view of a part of the electric turbocharger 1. As illustrated in FIGS. 1 and 2, the electric turbocharger 1 includes a compressor 10, a motor 20, and a turbine 30. The electric turbocharger 1 drives the compressor 10 by the motor 20 using electric power as a power source. The compressor 10 receives power from the motor 20 via a rotating shaft S and compresses air. The compressed air is discharged to, for example, an internal combustion engine. For example, the turbine 30 recovers exhaust gas discharged from the internal combustion engine and assists rotation of the rotating shaft S.

The compressor 10 includes an impeller 11 and a compressor casing 12. The compressor casing 12 includes a suction port 13 and a scroll flow passage 14. The suction port 13 is an opening coaxial with the rotating shaft S. The scroll flow passage 14 is formed to surround a rotating shaft RL. For example, the impeller 11 is fixed to the rotating shaft S and housed in the compressor casing 12. The impeller 11 is disposed on a back side of the suction port 13 when viewed from an outside of the compressor 10. The scroll flow passage 14 is formed to surround the impeller 11. The air sucked from the suction port 13 reaches the scroll flow passage 14 via the impeller 11. A diffuser flow passage 15 is formed between the impeller 11 and the scroll flow passage 14. The diffuser flow passage 15 receives the air from the impeller 11 and passes the air to the scroll flow passage 14. The diffuser flow passage 15 is formed by a wall surface of the compressor casing 12 and a diffuser plate 40 fixed to the compressor casing 12.

The motor 20 includes a rotor 21 and a stator 22. The rotor 21 is fixed to the rotating shaft S and rotates together with the rotating shaft S. The rotor 21 includes, for example, a plurality of permanent magnets. The stator 22 is a member provided to surround the rotor 21. The stator 22 includes a coil 22a. The rotating shaft S is rotated by driving of the motor 20.

The motor 20 is housed in a motor casing 27. The motor casing 27 includes a stator case 23, a pass block 24, and an outer case 25. The stator case 23 houses the stator 22. The pass block 24 is fixed to the stator case 23. The outer case 25 is provided to surround the stator case 23 and the pass block 24.

The stator case 23 has a cylindrical shape, and the stator 22 is fixed inside the stator case 23. The stator 22 includes the coil 22a wound around teeth, and a resin portion 22b that is filled in the stator case 23 and surrounds the coil 22a. The resin portion 22b is formed of a thermosetting resin.

The stator case 23 includes one end part facing the diffuser plate 40, and this end part is open. The other end part of the stator case 23 is closed by a case end surface 23a. A cooling water flow passage F1 is formed between the case end surface 23a and the outer case 25. The cooling water flow passage F1 is provided along the case end surface 23a, and cooling water passes through the cooling water flow passage F1.

The pass block 24 is attached to an outer periphery of the stator case 23. The pass block 24 is formed as a separate component from the stator case 23. In the pass block 24, a communication passage F2 for the cooling water is formed. Note that the pass block 24 is not limited to the separate component, and may be integrated with, for example, the outer case 25.

The resin portion 22b is provided in the stator case 23. One end part of the stator case 23 is opened, and an end part of the resin portion 22b is exposed. The end part of the resin portion 22b is disposed to face the diffuser plate 40. A heat dissipation layer is disposed between the resin portion 22b and the diffuser plate 40 in a first direction (e.g., an axial direction Sd of the rotating shaft S). For example, a heat dissipation member 28 is disposed between the resin portion 22b and the diffuser plate 40 in the axial direction Sd.

The diffuser plate 40 is disposed between the motor casing 27 and the compressor casing 12 in the axial direction Sd. The diffuser plate 40 is formed of a member having high thermal conductivity such as an aluminum alloy. For example, in the case of the aluminum alloy, the thermal conductivity is about 150 W/mK. The diffuser plate 40 includes a first end surface 40a (see FIG. 3) facing the resin portion 22b and an opposite second end surface 40b. The second end surface 40b forms the diffuser flow passage 15. The diffuser plate 40 is formed as an integral body without being divided from the first end surface 40a to the second end surface 40b.

In the diffuser plate 40, a cooling water flow passage F3 through which the cooling water passes is formed. The cooling water flow passage F3 is fluidly connected to the cooling water flow passage F1 of the motor casing 27 via the communication passage F2 of the pass block 24. The heat dissipation member 28 is disposed between the cooling water flow passage F3 of the diffuser plate 40 and the stator 22 in the axial direction Sd.

Structures of the stator 22, the heat dissipation member 28, and the diffuser plate 40 will be described in more detail with reference to FIGS. 3, 4, 5, and 6. The resin portion 22b includes a first installation portion (e.g., a heat dissipation member installation portion 22c) and a neck portion 22d protruding from the heat dissipation member installation portion 22c. The heat dissipation member installation portion 22c is a substantially flat surface. The heat dissipation member 28 is disposed on the heat dissipation member installation portion 22c.

The heat dissipation member 28 is, for example, a heat dissipation filler, heat dissipation grease, or a heat dissipation pad 28A, and may be a mixture thereof. The thermal conductivity of the heat dissipation member 28 is, for example, more than 2 W/mK and 10 W/mK or less. Further, the thermal conductivity of the heat dissipation member 28 is, for example, 2.5 W/mK or more and 5 W/mK or less. Further, the thermal conductivity of the heat dissipation member 28 is, for example, 3 W/mK or more and 4 W/mK or less. The thermal conductivity of the heat dissipation member 28 is, for example, higher than the thermal conductivity of the resin portion 22b and lower than the thermal conductivity of the diffuser plate 40.

The heat dissipation filler is, for example, a fluid having a viscosity to such an extent as to have shape retention, and is a member including fine particles (fillers) such as ceramics or metal having high thermal conductivity. The heat dissipation filler is cured after being installed on the heat dissipation member installation portion 22c. The heat dissipation grease is, for example, a member in which grease such as modified silicone is used as a base and the fine particles such as ceramics or metal having high thermal conductivity are mixed.

Figure 4:
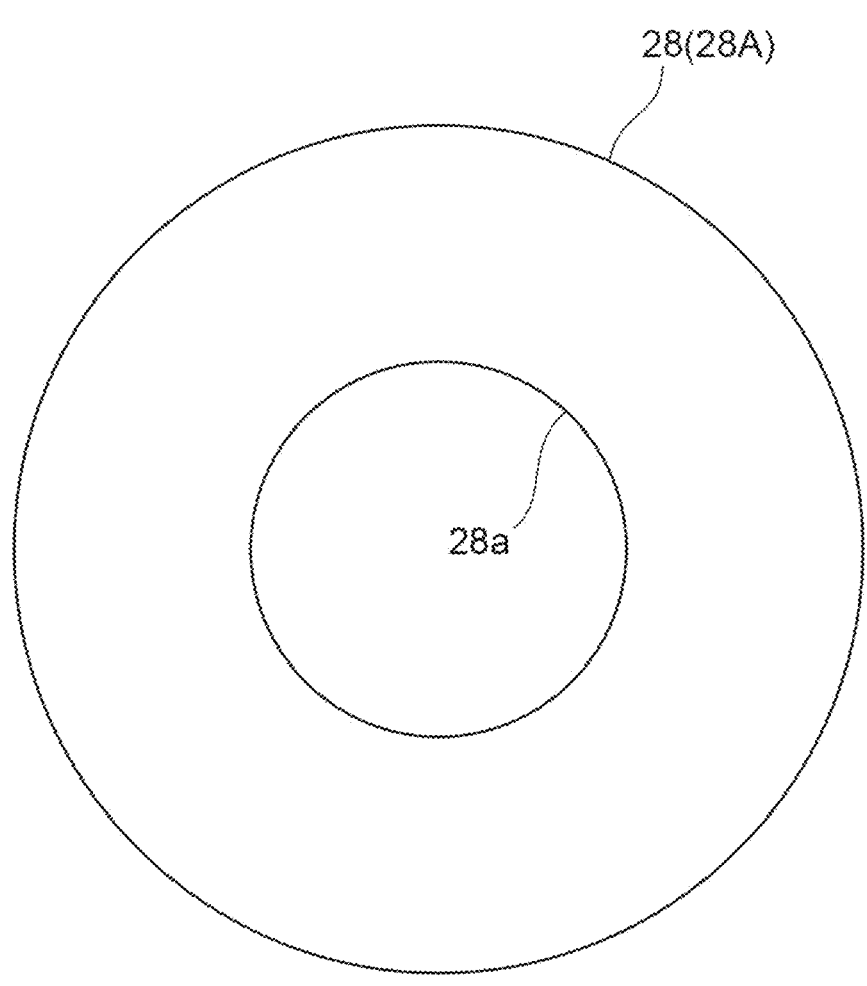
FIG. 4 is a plan view of the heat dissipation pad illustrated in FIG. 1.

FIG. 4 is a plan view of the heat dissipation pad 28A which is an example of the heat dissipation member 28. The heat dissipation pad 28A has a sheet shape having a predetermined shape. Having a predetermined shape (e.g., an annular shape) means having a stable shape already in a state before being disposed between the diffuser plate 40 and the stator 22. For example, the heat dissipation pad 28A can have a shape along an outer edge of the heat dissipation member installation portion 22c as the predetermined shape. Further, the heat dissipation pad 28A can have a shape that can be disposed on the heat dissipation member installation portion 22c while avoiding the neck portion 22d as the predetermined shape. For example, the heat dissipation pad 28A has an annular shape (a donut shape) in plan view, and has a circular opening 28a inside. The heat dissipation pad 28A is a member in which a resin such as silicone or acrylic is formed in a thin sheet shape. The heat dissipation pad 28A may have a structure including the fine particles such as ceramics or metal having high thermal conductivity. Further, the heat dissipation pad 28A may be a heat conductive sheet using graphite as a material. Furthermore, the heat dissipation member 28 may be a thermal pad.

A thickness of the heat dissipation pad 28A is, for example, 0.2 mm or more and 5 mm or less. Further, the thickness of the heat dissipation pad 28A can be 0.4 mm or more and 4 mm or less. Further, the thickness of the heat dissipation pad 28A can be 0.3 mm or more and 3 mm or less. The thickness of the heat dissipation pad 28A is, for example, thinner than the thickness of the diffuser plate 40. The diffuser plate 40 may include the first end surface 40a and the second end surface 40b, and the thickness of the heat dissipation pad 28A may be thinner than a thickness of a thickest portion of thicknesses from the first end surface 40a to the second end surface 40b. Furthermore, the thickness of the heat dissipation pad 28A may be thinner than a thickness of a thinnest portion of the thicknesses from the first end surface 40a to the second end surface 40b.

Figure 5:
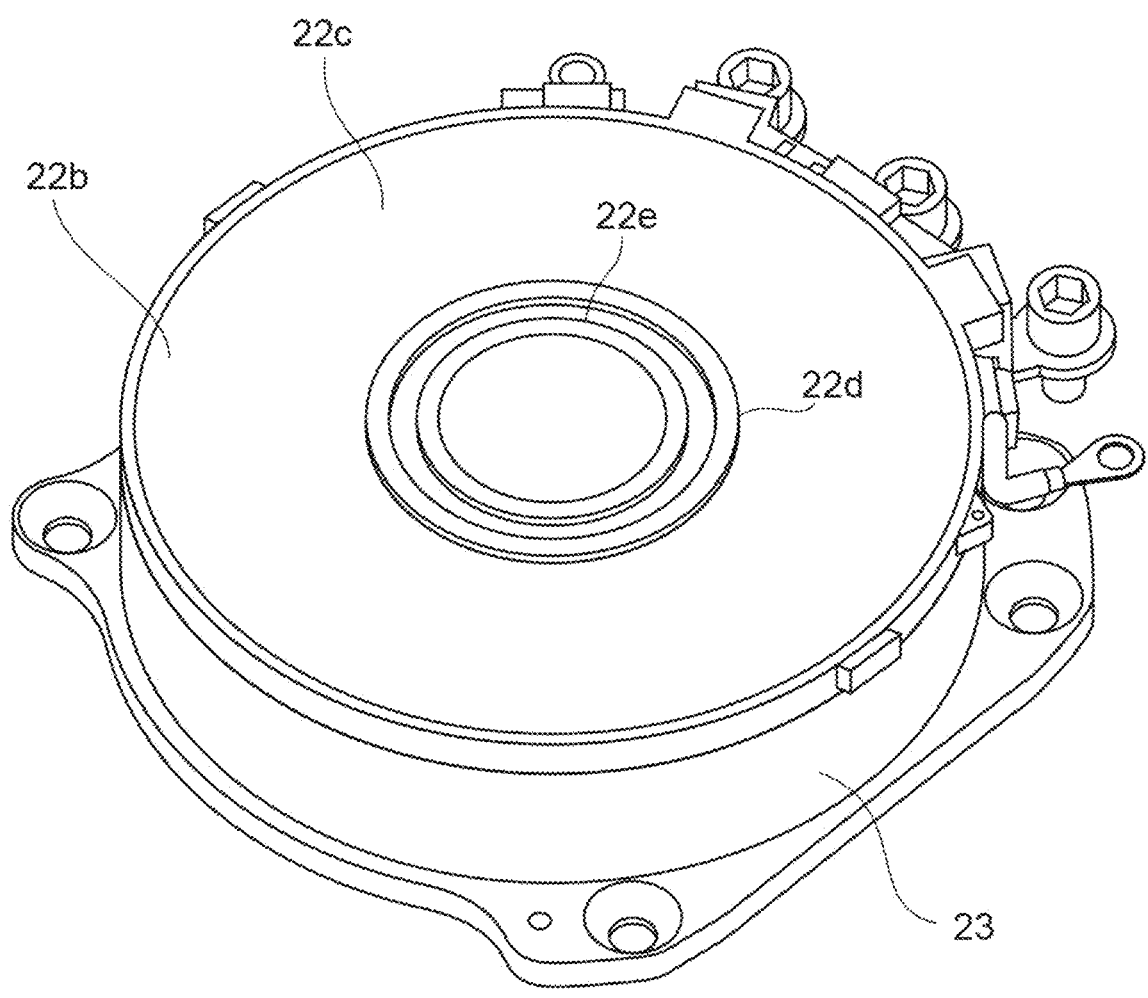
FIG. 5 is a perspective view of the stator assembly illustrated in FIG. 1.
Figure 6:
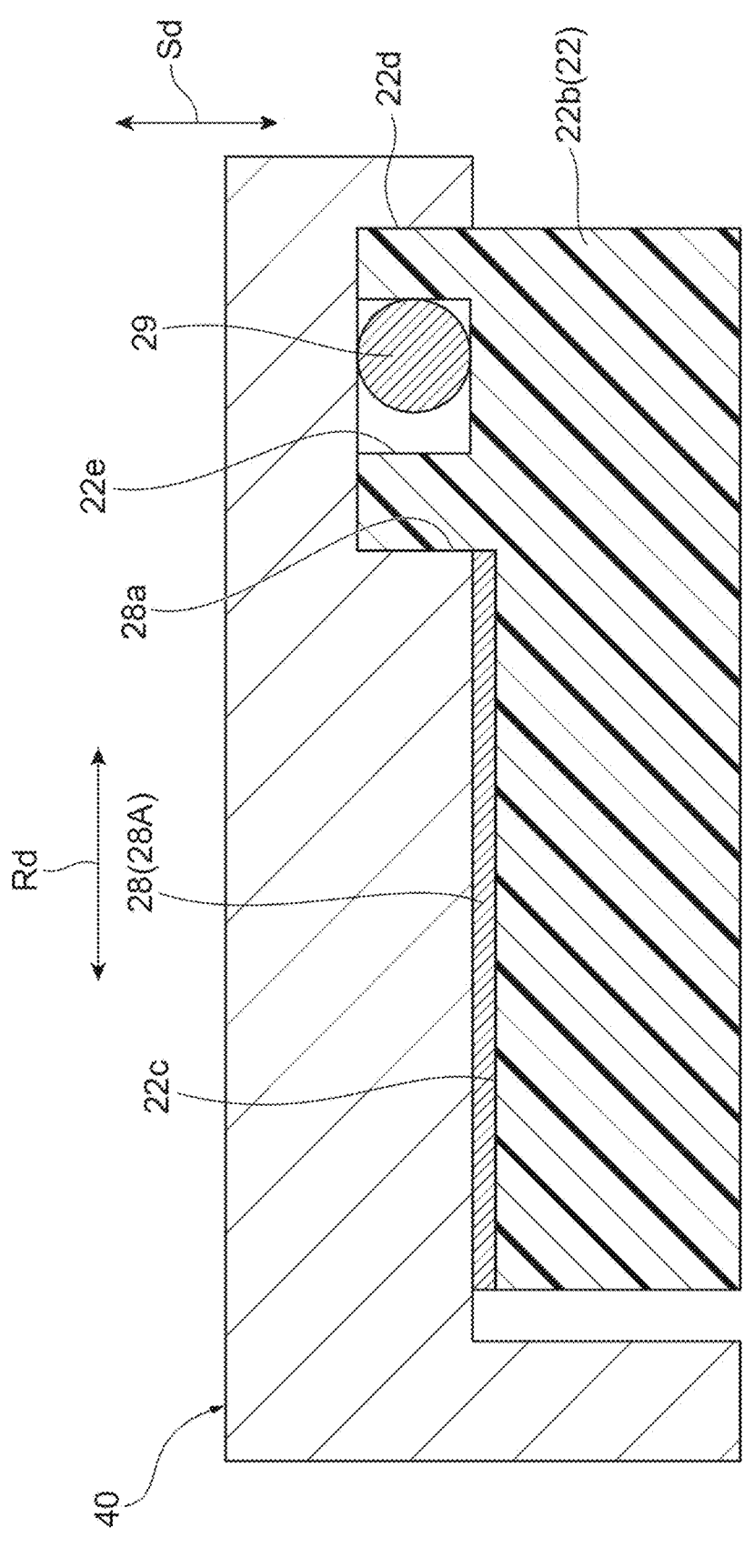
FIG. 6 is a cross-sectional view schematically illustrating a relationship between the diffuser plate, the heat dissipation pad, the seal member, and the stator.

As illustrated in FIG. 5, a heat dissipation member installation portion 22c which is an annular (a donut-shaped) flat surface is provided on an end surface of the resin portion 22b, and an annular (a donut-shaped) neck portion 22d is provided inside the heat dissipation member installation portion 22c. The heat dissipation member installation portion 22c and the neck portion 22d are provided to face the diffuser plate 40. The neck portion 22d protrudes with respect to a virtual plane including the heat dissipation member installation portion 22c. An opening into which the rotating shaft S and the rotor 21 are inserted is formed inside the neck portion 22d.

A seal groove 22e in which a seal (e.g., seal member 29) such as an O-ring is housed is formed at a tip of the neck portion 22d. The seal member 29 is an example of a seal portion. The seal member 29 housed in the seal groove 22e is crushed by contacting the diffuser plate 40 and elastically deformed to exhibit a sealing function. The sealing function of the seal member 29 means a function of restricting passage of the air (gas) and substantially preventing the passage of the air (gas). The seal member 29 is disposed to surround the rotating shaft S in a circumferential direction of the rotating shaft S. The seal member 29 is disposed between the heat dissipation member 28 disposed on the heat dissipation member installation portion 22c and the rotating shaft S in a second direction (a radial direction Rd of the rotating shaft S). For example, the seal member 29 is disposed between the heat dissipation pad 28A and the rotating shaft S in the radial direction Rd. The seal member 29 prevents the air (gas) present around the rotating shaft S and the rotor 21 from reaching the heat dissipation member 28. The neck portion 22d is an example of a second installation portion or a seal member installation portion.

The seal member 29 is, for example, a non-metal gasket, a semi-metallic gasket using a combination of metal and non-metal, a metal gasket, or the like. The nonmetallic gasket is, for example, a nonmetallic O-ring, a rubber sheet, a PTFE sheet, or the like. The semi-metallic gasket is, for example, a metal-jacket-type gasket, a spiral-type gasket, or the like. Examples of the metal gasket include a metal O-ring and a metal flat gasket.

Figure 3:
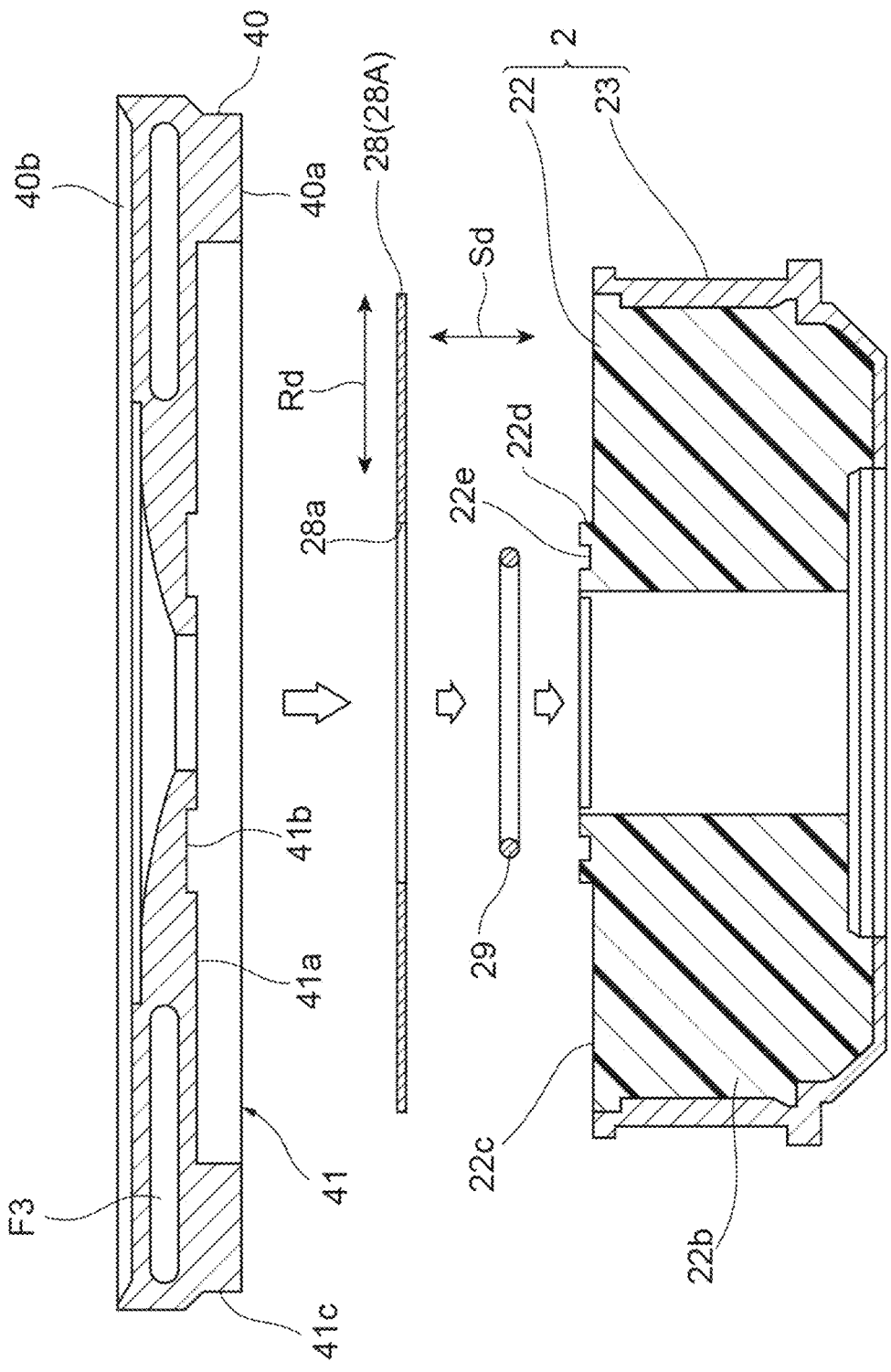
FIG. 3 is an exploded cross-sectional view illustrating a state before a stator assembly, a seal member, a heat dissipation pad, and a diffuser plate illustrated in FIG. 1 are assembled.

As illustrated in FIG. 3, the diffuser plate 40 includes a facing portion 41 facing the end part of the stator case 23 and the end part of the resin portion 22b. The facing portion 41 is provided with a peripheral wall portion 41c into which the end part of the stator case 23 is inserted. An annular (a donut-shaped) contact surface 41a contacting the heat dissipation member 28 and an annular (a donut-shaped) recess 41b for receiving the neck portion 22d are provided inside the peripheral wall portion 41c. The recess 41b contacts the seal member 29 housed in the seal groove 22e of the neck portion 22d.

The neck portion 22d is inserted to be fitted into the opening 28a at a center of the heat dissipation pad 28A to position the heat dissipation pad 28A. The neck portion 22d is an example of a positioning portion of the heat dissipation pad 28A. In the neck portion 22d illustrated in FIG. 3, the neck portion 22d exhibits functions of both the seal member installation portion and the positioning portion.

Figure 7A:
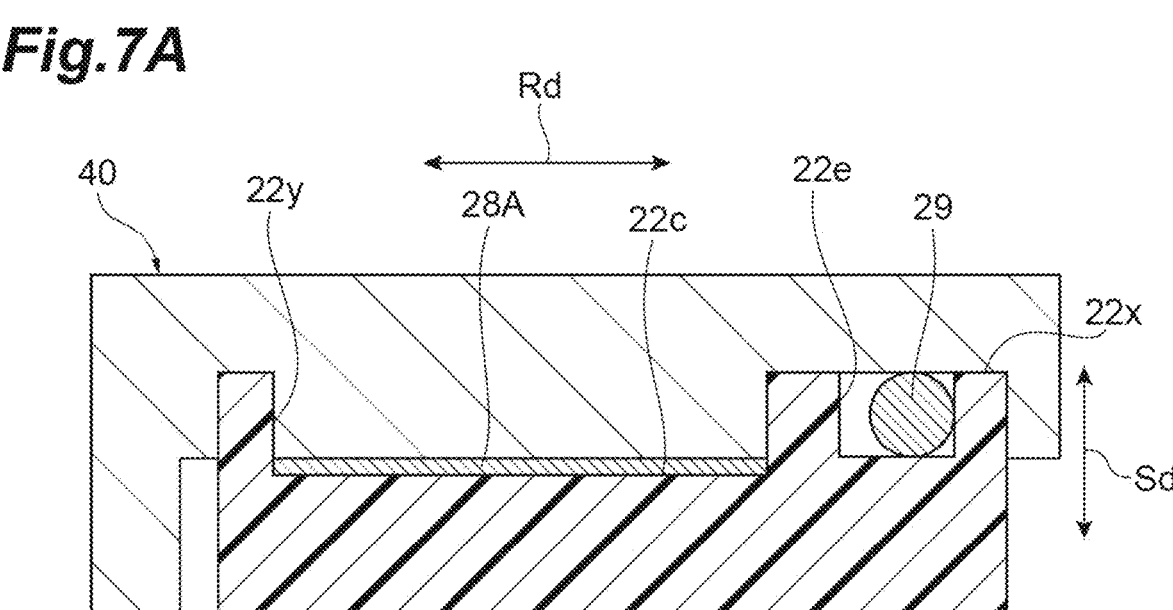
FIG. 7A is a cross-sectional view schematically illustrating an example of the diffuser plate, the heat dissipation pad, the seal member, and the stator.

As another example, the positioning portion may be provided separately from the seal member installation portion. For example, as illustrated in FIG. 7A, a neck portion 22x (an example of the seal member installation portion) and a protruding wall 22y (an example of the positioning portion) may be provided. The neck portion 22x is disposed between the heat dissipation pad 28A and the rotating shaft S in the radial direction Rd, and is provided at a position not in contact with the heat dissipation pad 28A. Further, the protruding wall 22y protrudes annularly so as to surround an outer edge of the heat dissipation pad 28A, and comes into contact with the outer edge of the heat dissipation pad 28A to position the heat dissipation pad 28A.

Figure 7B:
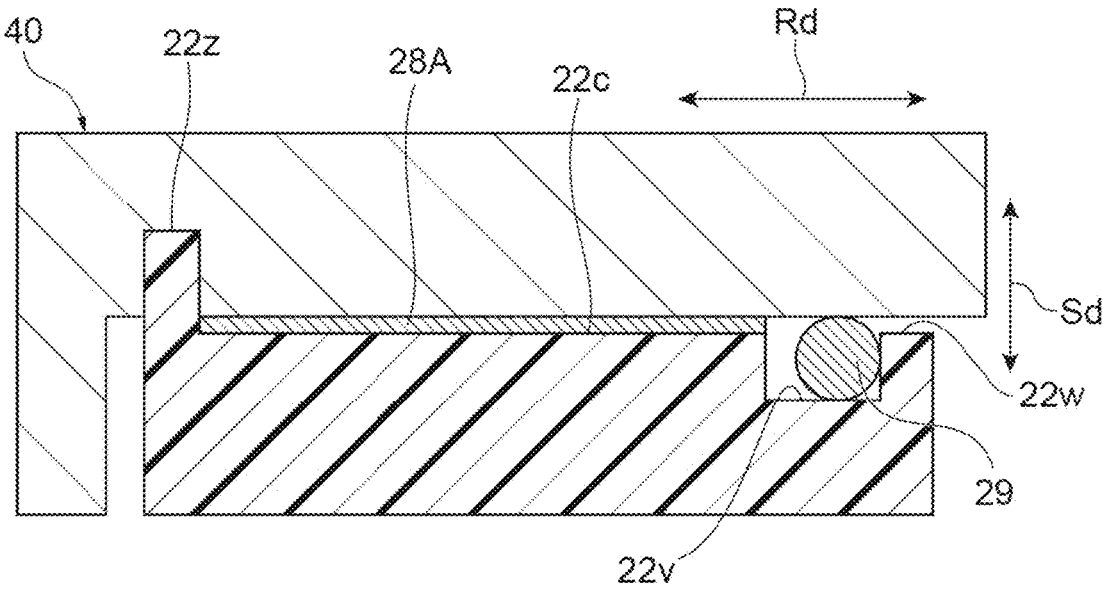
FIG. 7B is a cross-sectional view schematically illustrating another example of the diffuser plate, the heat dissipation pad, the seal member, and the stator.

Further, as another example, as illustrated in FIG. 7B, a seal member installation portion 22w and a protruding wall 22z (an example of the positioning portion) may be provided. In this example, the seal member installation portion 22w is formed by providing a seal groove 22v on substantially the same surface as the heat dissipation member installation portion 22c without protruding from it. Further, the protruding wall 22z protrudes annularly so as to surround the outer edge of the heat dissipation pad 28A, and comes into contact with the outer edge of the heat dissipation pad 28A to position the heat dissipation pad 28A.

Next, a manufacturing method for manufacturing the electric turbocharger 1 by assembling members and structures will be described with reference to FIGS. 1 and 3. For example, a motor assembly 200 is installed at a predetermined position. In the motor assembly 200, the stator case 23 is fixed in the motor casing 27. The coil 22a is housed in stator case 23, and further the resin portion 22b is formed to surround the coil 22a. Further, the rotating shaft S and the rotor 21 are arranged in the stator case 23. Furthermore, for example, the turbine 30 is assembled to the motor assembly 200.

The compressor 10 is assembled to the motor assembly 200. Since the motor assembly 200 is a heavy object, it is installed at a predetermined position in advance, and the members of the compressor 10 are attached from above to be assembled. The motor assembly 200 may be vertically disposed such that the rotating shaft S is directed in a vertical direction. In this state, the turbine 30 is disposed below, and the stator case 23 and the stator 22 are arranged above. Hereinafter, the stator case 23 and the stator 22 are referred to as a stator assembly 2.

As illustrated in FIG. 3, for example, the heat dissipation member 28 is installed on the stator assembly 2. In the case of the annular heat dissipation pad 28A, the heat dissipation pad 28A is mounted so as to surround the neck portion 22d. Since the heat dissipation pad 28A is readily positioned by contacting the neck portion 22d, assembly workability is improved.

Further, for the stator assembly 2 that is vertically disposed, the seal member 29 is installed in the seal groove 22e. The seal member 29 may be installed before or after the heat dissipation pad 28A is installed. Since the seal member 29 is housed in the seal groove 22e, the seal member 29 may be positioned and held stably.

The diffuser plate 40 is installed to cover the stator assembly 2 with the heat dissipation pad 28A and the seal member 29 installed in their predetermined positions. The facing portion 41 of the diffuser plate 40 is provided with the peripheral wall portion 41c, and an upper end part of the stator assembly 2 is inserted into the peripheral wall portion 41c. The facing portion 41 is provided with the annular recess 41b, and the neck portion 22d is inserted into the recess 41b. After the diffuser plate 40 is installed in the stator assembly 2, the compressor casing 12 and the like are assembled to complete the electric turbocharger 1.

As described above, the motor assembly 200 is the heavy object. Therefore, instead of moving the stator assembly 2 which is a part of the motor assembly 200, the heat dissipation pad 28A and the seal member 29 are installed at the predetermined positions on the stator assembly 2, and the diffuser plate 40 and the compressor casing 12 can be moved and mounted on the heat dissipation pad and the seal member 29 to be assembled, and thus the workability is improved.

As another manufacturing method for manufacturing the electric turbocharger 1, the electric turbocharger 1 may be manufactured by installing the motor assembly 200 such that the rotating shaft S is inclined with respect to the vertical direction, and assembling the heat dissipation pad 28A, the seal member 29, the diffuser plate 40, and the like to the motor assembly 200 from a lateral direction.

Next, operations and effects of the electric turbocharger 1 will be described. Since the motor 20 of the electric turbocharger 1 serves as a heat source, it may be necessary to remove heat. In the electric turbocharger 1, the heat dissipation member 28 may be disposed between the diffuser plate 40 and the stator 22 in the axial direction Sd. The heat from the stator 22 is transferred to the diffuser plate 40 through the heat dissipation member 28. Therefore, heat removal performance can be improved as compared with a form in which the heat dissipation member 28 is not interposed. Furthermore, the seal member 29 is disposed between the diffuser plate 40 and the stator 22 in the axial direction Sd, and the seal member 29 is disposed between the heat dissipation member 28 and the rotating shaft S in the radial direction Rd. Therefore, the seal member 29 may prevent the gas around the rotating shaft S or near the rotor 21 from passing between the diffuser plate 40 and the stator 22, reaching the heat dissipation member 28, and affecting the heat dissipation member 28.

The seal groove 22e is formed in the stator 22. By housing the seal member 29 in the seal groove 22e, the seal member 29 can be installed in the seal groove 22e.

In the stator 22 illustrated in FIG. 3, the stator 22 includes the heat dissipation member installation portion 22c on which the heat dissipation member 28 is installed, and the neck portion 22d protruding from the heat dissipation member installation portion 22c. The seal groove 22e for housing the seal member 29 is formed in the neck portion 22d. The neck portion 22d is received in the recess 41b of the diffuser plate 40. It may be necessary to ensure electrical insulation between the diffuser plate 40 and the coil 22a of the stator 22. Since the seal groove 22e is formed in the neck portion 22d protruding from the heat dissipation member installation portion 22c, the seal groove 22e can be formed at a position farther from the coil 22a than the heat dissipation member installation portion 22c. As a result, electrical insulation between the diffuser plate 40 and the coil 22a may be ensured.

The heat dissipation member 28 illustrated in FIG. 3 is the heat dissipation pad 28A. When installing the heat dissipation pad 28A on the heat dissipation member installation portion 22c, the heat dissipation pad 28A already has the predetermined shape. Accordingly, the heat dissipation pad 28A may exhibit shape stability, and is readily handled. Therefore, with the heat dissipation pad 28A, the heat dissipation pad 28A may be readily installed on the heat dissipation member installation portion 22c.

Further, the neck portion 22d illustrated in FIG. 3, functions as the positioning portion of the heat dissipation pad 28A. By disposing the heat dissipation pad 28A so as to interfere with the neck portion 22d and be along the neck portion 22d, the heat dissipation pad 28A is readily disposed on the heat dissipation member installation portion 22c.

In the heat dissipation member 28 illustrated in FIG. 2, the heat dissipation member 28 is disposed between the cooling water flow passage F3 of the diffuser plate 40 and the stator 22. Accordingly, the heat from the stator 22 is readily transferred to the cooling water flow passage F3 through the heat dissipation member 28.

The thermal conductivity of the heat dissipation member 28 illustrated in FIG. 2, is higher than the thermal conductivity of the resin portion 22b included in the stator 22 and lower than the thermal conductivity of the diffuser plate 40. The heat is readily transferred from the resin portion 22b of the stator 22 to the heat dissipation member 28 and from the heat dissipation member 28 to the diffuser plate 40, and the heat removal performance can be improved.

The thickness of the heat dissipation pad 28A illustrated FIG. 3, is thinner than the thickness of the diffuser plate 40. By making the thickness of the heat dissipation pad 28A thinner than the thickness of the diffuser plate 40, the heat removal performance from the stator 22 to the diffuser plate 40 can be improved.

Some examples illustrated in FIGS. 1 to 6, 7A, and 7B may be implemented in various forms with various modifications and improvements based on knowledges of those skilled in the art. In addition, modifications may be configured using the technical matters described in the above-described examples. Configurations of the examples may be combined and used.

For example, a condition that the heat dissipation member is disposed between the cooling water flow passage of the diffuser plate and the stator is a first condition, a condition that the heat conductivity of the heat dissipation member is higher than the heat conductivity of the stator and lower than the heat conductivity of the diffuser plate is a second condition, and a condition that the thickness of the heat dissipation pad is thinner than the thickness from the first end surface to the second end surface of the diffuser plate is a third condition. Here, in the examples described above, an electric turbocharger that satisfies the first condition and the second condition, an electric turbocharger that satisfies the first condition and the third condition, an electric turbocharger that satisfies the second condition and the third condition, or the like may be used.

Some additional examples are disclosed as follows, with continued reference to the drawings for convenience of description.

An example electric turbocharger (1) includes: a rotating shaft (S); a motor (20) including a rotor (21) fixed to the rotating shaft (S), and a stator (22); a motor casing (27) housing the motor (S); a compressor casing (12) including a scroll flow passage (14); a diffuser plate (40) located between the motor casing (27) and the compressor casing (12), a heat dissipation member (28) located between the diffuser plate (40) and the stator (22); and a seal (29) located between the diffuser plate (40) and the stator (22) and located between the heat dissipation member (28) and the rotating shaft (S).

In the electric turbocharger (1), the stator may include a seal groove (22e) that houses and contacts the seal (29).

In the electric turbocharger (1), the stator (22) may include: a first installation portion (22c) where the heat dissipation member (28) is installed; and a second installation portion (22x) facing the diffuser plate (40), protruding from the first installation portion (22c). The diffuser plate (40) may include a recess (41d) receiving the second installation portion (22d). The seal (29) may be located between the recess (41d) and the diffuser plate (40), and may contact the recess (41d) and the second installation portion (22d).

In the electric turbocharger (1), the second installation portion (22d) may include a seal groove (22e) housing and contacting the seal (29).

In the electric turbocharger (1), the heat dissipation member (28) may include a heat dissipation pad (28A).

In the electric turbocharger (1), the heat dissipation pad (28A) contacts the diffuser plate (40) and the stator (22).

In the electric turbocharger (1), the stator (22) may include an installation portion (22c) where the heat dissipation pad (28A) may be installed. The heat dissipation pad (28A) may have an annular shape that is located on an outer circumference of the installation portion (22c).

In the electric turbocharger (1), the stator (22) may include: an installation portion (22c) where the heat dissipation pad (28A) is installed; and a positioning portion (22d) protruding from the installation portion (22c) to hold the heat dissipation pad (28A).

In the electric turbocharger (1), the diffuser plate (40) may include a cooling water flow passage (F3) where cooling water flows, and the heat dissipation member (28) may be located between the cooling water flow passage (F3) and the stator (22).

In the electric turbocharger (1), the stator (22) may include a resin portion (22b), and thermal conductivity of the heat dissipation member (28) may be higher than thermal conductivity of the resin portion (22b) and lower than thermal conductivity of the diffuser plate (40).

In the electric turbocharger (1), the stator (22) may include a resin portion (22b). The resin portion (22b) may include: a first installation portion (22c) contacting the heat dissipation member (28); and a second installation portion (22d) facing the diffuser plate (40). The heat dissipation member (28) may surround the second installation portion (22d).

In the electric turbocharger (1), the heat dissipation member (28) may include a heat dissipation pad (28A). The diffuser plate (40) may include a first end surface (40a) in contact with the heat dissipation pad (28A) and a second end surface (40b) forming a diffuser flow passage (15) on a side opposite to the first end surface (40a). A thickness of the heat dissipation pad (28A) may be thinner than a thickness from the first end surface (40a) to the second end surface (40b) of the diffuser plate (40).

An example electric turbocharger (1) includes a motor (20) including a rotor (21) and a stator (21); a rotating shaft (S) configured to be rotated by driving the motor (20); an impeller (11) fixed to the rotating shaft (S); a compressor casing (12) housing the impeller (11); a diffuser plate (40) fixed to the compressor casing (12); a heat dissipation layer (28) located between the diffuser plate (40) and the stator (22); and a seal (29) located between the diffuser plate (40) and the stator (22), and located between the heat dissipation layer (28) and the rotating shaft (S) to restrict passage of gas.

In the electric turbocharger (1), the dissipation layer (28) may include a heat dissipation pad (28A), and the stator (22) may include an installation portion (22c) in which the heat dissipation pad (28A) may be installed.

In the electric turbocharger (1), the heat dissipation pad (28A) may include an opening (28a), and the stator (22) may include a neck portion (22) inserted in the opening (28a) and positions the heat dissipation pad (28A).

In the electric turbocharger (1), the seal (29) located between the neck portion (22) and the diffuser plate (40).

In the electric turbocharger (1), the neck portion (22) may include a seal groove (22e) housing the seal (29).

In the electric turbocharger (1), the diffuser plate (40) may include a recess (41b) receiving the neck portion (22) and contacting the seal (29) located in the seal groove (29).

An example electric turbocharger (1) includes: a motor (20) including a rotor (21) and a stator (22); a rotating shaft (S) configured to be rotated by driving the motor (20); an impeller (11) fixed to the rotating shaft (S); a compressor casing (12) housing the impeller (11); a diffuser plate (40) located between the stator (22) and the compressor casing (12) in an axial direction of the rotating shaft; a heat dissipation pad (28A) located between the stator (22) and the diffuser plate (40) in the axial direction, and surrounding the rotating shaft (S), a seal (29) located between the stator (22) and the diffuser plate (40) in the axial direction, and surrounding the rotating shaft (S), wherein the seal (29) is located between the heat dissipation pad (28A) and the rotating shaft (S) in a radial direction of the rotating shaft.

In the electric turbocharger (1), the heat dissipation pad (28A) may include an opening (28a), the stator (22) may include a neck portion (22d) inserted into the opening (28a), and the neck portion (22d) may include a seal groove (22e) in which the seal (29) is located.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. An electric turbocharger comprising:
a rotating shaft;
a motor including a rotor fixed to the rotating shaft, and a stator;
a motor casing housing the motor;
a compressor casing including a scroll flow passage;
a diffuser plate located between the motor casing and the compressor casing,
a heat dissipation pad located between the diffuser plate and the stator; and
a seal located between the diffuser plate and the stator and located between the heat dissipation pad and the rotating shaft.

2. The electric turbocharger according to claim 1, wherein the stator comprises a seal groove that houses and contacts the seal.

3. The electric turbocharger according to claim 1,
wherein the stator includes:
a first installation portion where the heat dissipation pad is installed; and
a second installation portion facing the diffuser plate, protruding from the first installation portion,
wherein the diffuser plate comprises a recess receiving the second installation portion, and
wherein the seal is located between the second installation portion and the diffuser plate, and contacts the second installation portion and the recess.

4. The electric turbocharger according to claim 3, wherein the second installation portion includes a seal groove housing and contacting the seal.

5. The electric turbocharger according to claim 1, wherein the heat dissipation pad contacts the diffuser plate and the stator.

6. The electric turbocharger according to claim 1,
wherein the stator comprises an installation portion where the heat dissipation pad is installed, and
wherein the heat dissipation pad has an annular shape that is located on an outer circumference of the installation portion.

7. The electric turbocharger according to claim 1, wherein the stator includes:
an installation portion where the heat dissipation pad is installed; and
a positioning portion protruding from the installation portion to hold the heat dissipation pad.

8. The electric turbocharger according to claim 1,
wherein the diffuser plate comprises a cooling water flow passage where cooling water flows, and
wherein the heat dissipation pad is located between the cooling water flow passage and the stator.

9. The electric turbocharger according to claim 1,
wherein the stator includes a resin portion, and
wherein thermal conductivity of the heat dissipation pad is higher than thermal conductivity of the resin portion and lower than thermal conductivity of the diffuser plate.

10. The electric turbocharger according to claim 1,
wherein the stator includes a resin portion,
wherein the resin portion includes:
a first installation portion contacting the heat dissipation pad; and a second installation portion facing the diffuser plate, and
wherein the heat dissipation pad surrounds the second installation portion.

11. The electric turbocharger according to claim 1,
wherein the diffuser plate includes a first end surface in contact with the heat dissipation pad and a second end surface forming a diffuser flow passage on a side opposite to the first end surface, and
wherein a thickness of the heat dissipation pad is thinner than a thickness from the first end surface to the second end surface of the diffuser plate.

12. An electric turbocharger comprising:
a motor including a rotor and a stator;
a rotating shaft configured to be rotated by driving the motor;
an impeller fixed to the rotating shaft;
a compressor casing housing the impeller;
a diffuser plate fixed to the compressor casing;
a heat dissipation layer located between the diffuser plate and the stator; and
a seal located between the diffuser plate and the stator in an axial direction of the rotating shaft,
wherein the seal is located between the heat dissipation layer and the rotating shaft in a radial direction of the rotating shaft to restrict passage of gas, and
wherein the seal is spaced apart from the heat dissipation layer.

13. The electric turbocharger according to claim 12,
wherein the heat dissipation layer comprises a heat dissipation pad that includes an opening, and
wherein the stator includes a neck portion inserted in the opening and positions the heat dissipation pad.

14. The electric turbocharger according to claim 13, wherein the seal is located between the neck portion and the diffuser plate.

15. The electric turbocharger according to claim 13, wherein the neck portion comprises a seal groove housing the seal.

16. The electric turbocharger according to claim 15, wherein the diffuser plate comprises a recess receiving the neck portion and contacting the seal located in the seal groove.

17. The electric turbocharger according to claim 12, wherein the heat dissipation layer comprises fine particles.

18. The electric turbocharger according to claim 17, wherein the fine particles include ceramic or metal.

19. An electric turbocharger comprising:
a motor including a rotor and a stator;
a rotating shaft configured to be rotated by driving the motor;
an impeller fixed to the rotating shaft;
a compressor casing housing the impeller;
a diffuser plate located between the stator and the compressor casing in an axial direction of the rotating shaft;
a heat dissipation pad located between the stator and the diffuser plate in the axial direction, and surrounding the rotating shaft; and
a seal located between the stator and the diffuser plate in the axial direction, and surrounding the rotating shaft,
wherein the seal is located between the heat dissipation pad and the rotating shaft in a radial direction of the rotating shaft.

20. The electric turbocharger according to claim 19,
wherein the heat dissipation pad includes an opening,
wherein the stator includes a neck portion inserted into the opening, and wherein the neck portion includes a seal groove in which the seal is located.

* * * * *